US005550551A

United States Patent [19]
Alesio

[11] Patent Number: 5,550,551
[45] Date of Patent: Aug. 27, 1996

[54] POSITION MONITORING SYSTEM AND METHOD

[75] Inventor: Thomas Alesio, Malibu, Calif.

[73] Assignee: AT&T Corp., Murray Hill, N.J.

[21] Appl. No.: 279,962

[22] Filed: Jul. 25, 1994

[51] Int. Cl.$^6$ ........................................................ G01S 3/02
[52] U.S. Cl. ............................................ 342/457; 342/357
[58] Field of Search .................................... 342/357, 457, 342/449; 455/12.1

[56] References Cited

U.S. PATENT DOCUMENTS

| | | | |
|---|---|---|---|
| 5,003,317 | 3/1991 | Gray et al. | 342/457 |
| 5,218,367 | 6/1993 | Sheffer et al. | 342/457 |
| 5,223,844 | 6/1993 | Mansell et al. | |
| 5,311,197 | 5/1994 | Sorden et al. | |
| 5,319,374 | 6/1994 | Desai et al. | |
| 5,355,140 | 10/1994 | Slavin et al. | 342/386 |
| 5,365,451 | 11/1994 | Wang et al. | 364/449 |

OTHER PUBLICATIONS

Getting, Ivan A., "The Global Positioning System," *IEEE Spectrum*, Dec. 1993, pp. 36–47.
Headline #5, Copyright, GPS Report [DE 24] via NewsNet, Thursday, Feb. 25, 1993.
Sintay, Brian, "Secure Profits: Anti–theft devices are giving dealers sound grosses," Crain Communications, Inc., Automotive News, Mar. 7, 1994.

*Primary Examiner*—Thomas H. Tarcza
*Assistant Examiner*—Dao L. Phan

[57] ABSTRACT

A monitoring system and method, particularly applicable to vehicle monitoring, detects theft of a vehicle or other object and automatically transmits its current position to the proper authorities. For vehicle monitoring, a vehicle monitoring unit mounted on the vehicle determines the initial position of the vehicle and thereafter periodically determines the current position of the vehicle via a position detector. Preferably, the position detector consists of a satellite receiver, such as a GPS receiver, for receiving satellite signals from a plurality of satellites. A controller circuit determines the position of the vehicle from the satellite signals. A range of movement of the vehicle is then determined by comparing the initial position and the current position. When the detected range equals or exceeds a selected range limit, the controller circuit activates a transmitter which transmits position signals representative of the current position of the vehicle. The range limit may be permanently set during manufacture of the unit or may be selectable by an operator. The position signals are received by a remote dispatch center which relays the position of the vehicle to appropriate law enforcement officials or a security service.

24 Claims, 3 Drawing Sheets

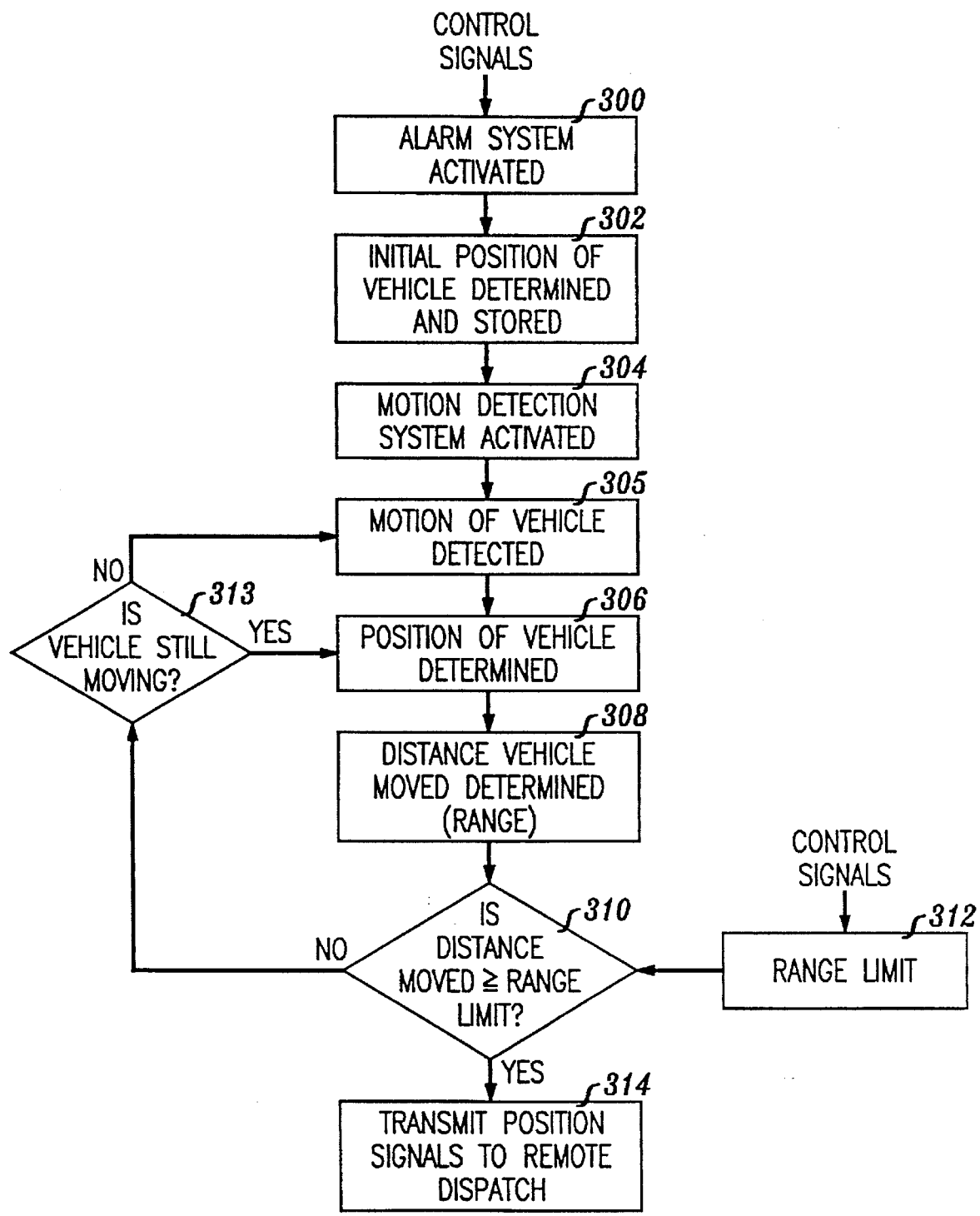

POSITION MONITORING SYSTEM AND METHOD

BACKGROUND OF THE INVENTION

The present invention relates generally to anti-theft systems and more particularly, to an object monitoring system and method wherein the location of an object to be protected is substantially continuously transmitted to a remote dispatch center upon the object being moved beyond a selected range. While the present invention is generally applicable for anti-theft protection of any object, it is particularly applicable to anti-theft protection of motor vehicles for which it will first be applied and, accordingly, it will be described with reference to this application herein.

The Federal Bureau of Investigation estimates that a vehicle is stolen every 20 seconds in the United States. Fewer than one in five of these vehicles are recovered. Faced with this high crime rate, vehicle owners, insurance companies, law enforcement agencies and the like are continually searching for improved vehicle alarm and recovery systems which deter would-be thieves or, after the vehicle has been stolen, facilitate locating the stolen vehicle.

One commercial vehicle tracking and security system is marketed by the LoJack Corporation of Dedham, Mass. The LoJack device or transmitter is hidden in a recess in a vehicle. After the vehicle has been reported stolen, the LoJack device is activated by a law enforcement transmitter. Thereafter, the LoJack device emits signals representative of the vehicle's location. Law enforcement officials are then able to follow the signals emitted by the LoJack transmitter to the stolen vehicle.

In such prior systems, problems arise when the vehicle is to be left unattended for an extended period of time. For example, the vehicle may be parked at an airport parking area for weeks. If the vehicle is stolen, the owner of the vehicle may not know and report the theft for days or even weeks. Thus, the thief would have the vehicle for a relatively long period of time before the law enforcement officials attempt to activate the LoJack transmitter. By this time, the vehicle may be out of range of the area served or completely stripped such that its recovery is rather hollow. To alleviate this problem, vehicle alarm systems should automatically sense theft and notify the proper authorities.

One such vehicle tracking and security system is disclosed in U.S. Pat. No. 5,223,844 issued to Mansell et al. The Mansell et al. system comprises a mobile unit installed in a vehicle which unit is activated by a conventional in-vehicle alarm, such as proximity or intrusion sensors, or by a vehicle occupant. The mobile unit includes a transmitter and a position detector, such as a Global Positioning System (GPS) receiver for detecting the position of the vehicle. When an event occurs which activates the in-vehicle alarm, or the system is activated by a vehicle occupant, the mobile unit in the vehicle transmits a signal to a control center. This signal includes encoded information which specifies the type of event and the present position of the vehicle. Thereafter, the mobile unit continually transmits the vehicle position to the control center. Based on the transmitted information, the control center takes appropriate action, such as dispatching law enforcement or emergency personnel.

Since the Mansell et al. system employs a conventional in-vehicle alarm to activate the mobile unit, it is susceptible to inadvertent activation. This problem may be exacerbated in certain situations, such as parking in a valet parking garage. in the valet parking garage, a parking attendant typically parks the vehicle and retains possession of the vehicle keys so that the vehicle may be later moved to accommodate other vehicles. In a worse case, the attendant may forget, or be unable, to activate the security system after parking the vehicle.

If the attendant does properly activate the security system, the attendant may forget to deactivate the in-vehicle alarm before moving the vehicle and inadvertently trigger the alarm. Due to the wide variety of vehicle alarms, the parking attendant may also have difficulty disarming the alarm.

Accordingly, there is a need for a vehicle monitoring system and method for a vehicle which is automatically activated upon movement of the vehicle beyond a predefined range, which preferably permits the predefined range to be variably selected by the vehicle operator, and which, once activated, generates and transmits signals representative of the location of the stolen vehicle.

SUMMARY OF THE INVENTION

This need is met by the vehicle monitoring system and method of the present invention wherein a vehicle is equipped with a vehicle monitoring unit which, when activated, monitors the current position of the vehicle and automatically transmits position signals indicative of the location of the vehicle including vehicle altitude upon movement of the vehicle beyond a predefined range of movement which preferably is selected by a vehicle operator. A remote dispatch center receives the position signals, determines the location of the vehicle based on the position signals and transmits the location of the vehicle to law enforcement personnel or a security service such that the vehicle may be readily recovered.

In accordance with one aspect of the present invention, a vehicle monitoring unit comprises a position detector for detecting a current position of the vehicle. A controller circuit connected to the position detector detects movement of the vehicle based on the position of the vehicle, determines a range of movement of the vehicle and generates position signals indicative of the current position of the vehicle. A transmitter is connected to the controller circuit for transmitting the position signals.

Preferably, the position detector comprises a satellite receiver, such as a Global Positioning System (GPS) receiver, for receiving satellite signals from a plurality of satellites and for detecting the position of the vehicle based on the satellite signals. For ease of operation, the vehicle monitoring unit includes a remote control receiver for receiving control signals, which may be infrared signals, and for transmitting the control signals to the controller circuit. In response to the control signals, the controller circuit activates and deactivates the vehicle monitoring unit.

The controller circuit preferably comprises a comparator for comparing the range to a range limit. The controller circuit then transmits the position signals based on the comparison. Further, a motion detector is connected to the controller circuit for detecting movement of the vehicle and for generating a movement signal representative thereof. The controller circuit then determines the range of movement of the vehicle in response to the movement signal.

In accordance with another aspect of the present invention, a monitoring system comprises a remote dispatch center for communicating with appropriate law enforcement or security system personnel. An object monitoring unit is positioned on an object for determining the position of the object, for monitoring movement of the object based on the position of the object and for transmitting position signals indicative of the position of the object in response to specified movement of the object.

Preferably, the object monitoring unit includes a position detector for determining the position of the object. A controller circuit is connected to the position detector for monitoring the position of the object, for determining the movement of the object based on its position, for detecting a range of the movement of the object and for generating the position signals for transmission based on the range of movement of the object. A transmitter is provided for transmitting the position signals from the object monitoring unit to the remote dispatch center.

In accordance with yet another aspect of the present invention, a method for activating a vehicle monitoring system is provided. The method comprises the steps of: determining a current position of the vehicle; determining a range of movement of the vehicle based on the current position; comparing the range of movement of the vehicle to a range limit; and, transmitting position signals representative of the position of the vehicle based on the comparison. Preferably, the method comprises the step of activating the vehicle monitoring unit in response to control signals received from a remote transmitter. The range limit may then be selected based on the control signals.

The step of determining the position of the vehicle preferably comprises the steps of: receiving a plurality of satellite signals; and, determining the position of the vehicle based on the satellite signals. The step of transmitting position signals preferably comprises the step of transmitting the position signals when the range of movement exceeds the range limit.

In accordance with still another aspect of the present invention, a method for activating an object monitoring system comprising the steps of: determining a current position of an object to be monitored; determining a range of movement of said object based on said current position; comparing said range of movement of said object to a range limit; and, transmitting position signals representative of the position of said object based on said comparison.

These and other features and advantages of the present invention will become apparent from the following detailed description, the accompanying drawings and the appended claims.

BRIEF DESCRIPTION OF THE DRAWINGS

FIG. 3 is a flow chart illustrating operation of a vehicle monitoring system in accordance with the present invention.

DETAILED DESCRIPTION OF THE INVENTION

Figure 1:
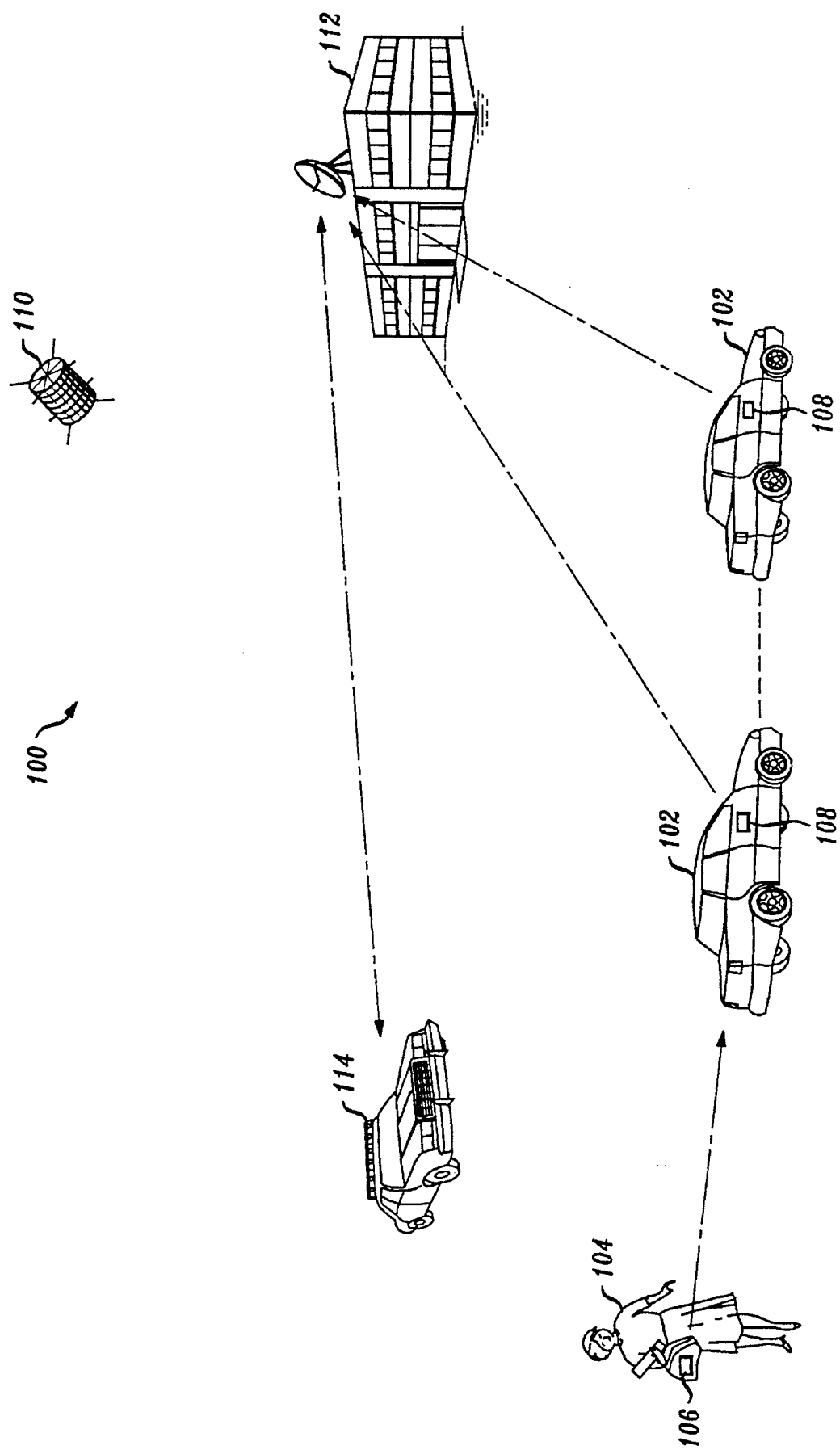
FIG. 1 illustrates a vehicle monitoring system operable in accordance with the present invention.

While the present invention is generally applicable for anti-theft protection of any object, it is particularly applicable to anti-theft protection of motor vehicles for which it will first be applied and, accordingly, it will be described with reference to this application herein. A vehicle monitoring system 100 which senses theft of a vehicle 102 and notifies the proper authorities in accordance with the present invention is shown in FIG. 1. A vehicle operator 104 uses a remote transmitter 106 to activate and deactivate a vehicle monitoring unit 108 mounted in the vehicle 102. When activated, the unit 108 determines the initial position of the vehicle 102. A motion detector 109 in the unit 108 detects any initial movement of the vehicle 102 and generates a signal representative of detected movement. After movement of the vehicle 102 is detected, the unit 108 periodically determines the current position of the vehicle 102. The unit 108 preferably determines the position of the vehicle 102 from satellite signals received from a plurality of satellites 110.

Using satellite signals, the unit 108 detects movement of the vehicle 102 and determines a range of movement of the vehicle 102 based on the initial position and the current position of the vehicle 102. When the range of movement exceeds a predetermined, or preferably selected, range limit, the unit 108 automatically and substantially continuously transmits position signals indicative of the current position of the vehicle 102 to a remote dispatch center 112. The remote dispatch center 112 then transmits the location of the vehicle 102 to law enforcement personnel in a mobile security unit 114 to facilitate recovery of the vehicle 102.

Figure 2:
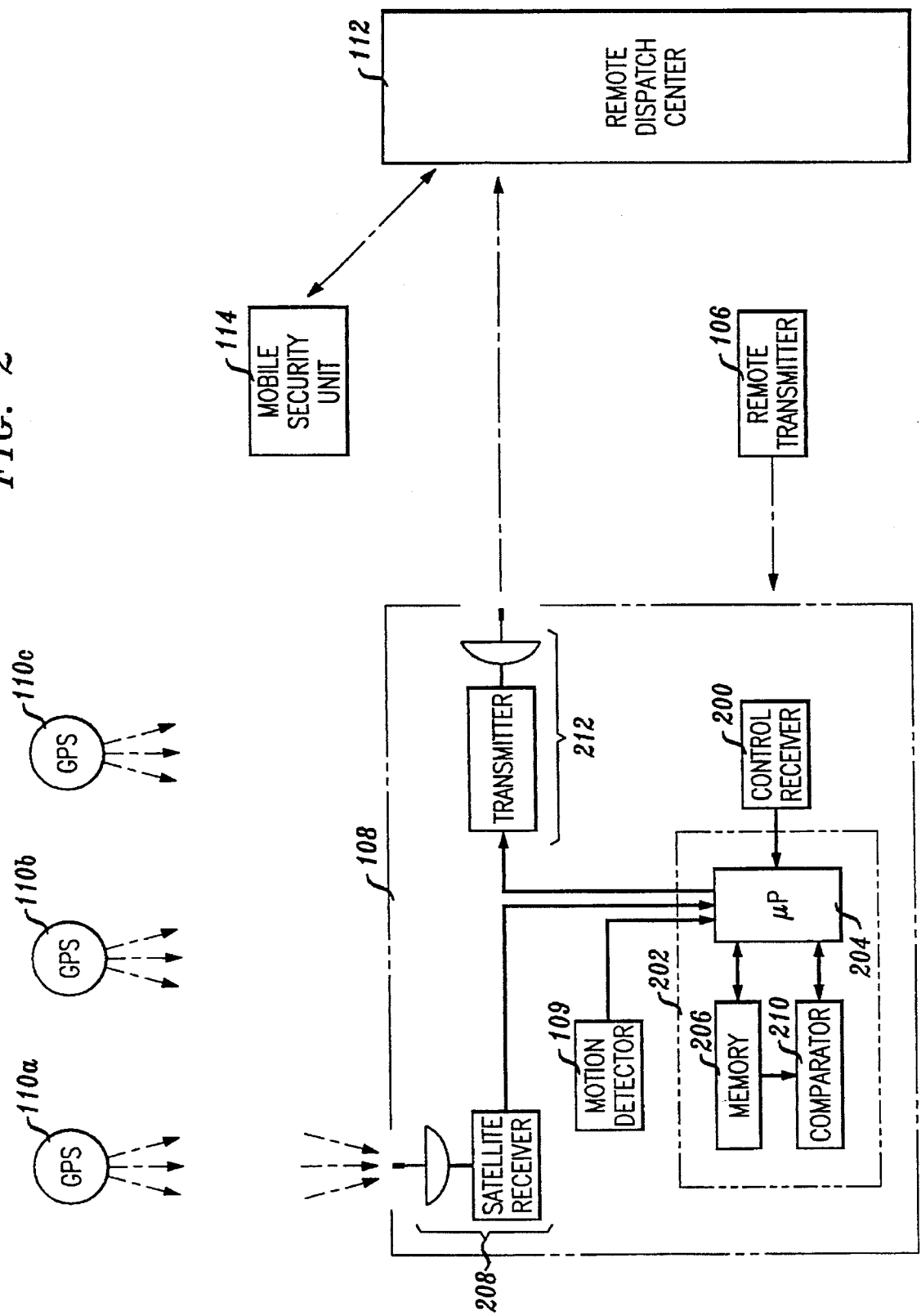
FIG. 2 is a schematic block diagram of monitoring system operable in accordance with the present invention.

Operation of the vehicle monitoring system 100 will now be described in detail with reference to FIGS. 2 and 3. As noted, the unit 108 is initially activated by the vehicle operator 104 via the remote transmitter 106. It should be understood, however, that the unit 108 may also be activated by other means, such as a mechanical switch. While a variety of remote activation and deactivation arrangements including a telephone pager component, a cellular telephone, or the like may be used, the remote transmitter 106 is preferably a hand-held unit which transmits control signals, such as infrared signals, encoded with information to activate the unit 108 and to select a range limit. Thus, the vehicle operator 104 may vary the range limit based on where the vehicle 102 is parked.

For example, in parking areas having valet parking, the range limit should be set so that the valet can move the vehicle 102 within the parking area without inadvertently triggering the system 100. Conversely, in parking areas where the vehicle 102 is parked by the vehicle operator 104, the range limit may be set so that virtually any movement of the vehicle 102 would trigger the system 100. For ease of operation, the remote transmitter 106 may be designed to permit selection of a plurality of distinct range limits of latitude, longitude and altitude, such as 10 feet, 50 feet and 100 feet. Alternatively, the range limit may be permanently set during manufacture of the unit 108.

A remote control receiver 200 receives the control signals and transmits the control signals to a controller circuit 202. In the illustrated embodiment, the controller circuit 202 comprises a microprocessor 204 which decodes the control signals and stores the selected range limit in a memory device 206. A position detector determines the initial position of the vehicle 102. In response to the signal from the motion detector 109 indicating movement of the vehicle 102, the position detector periodically determines the current position of the vehicle 102. Of course, sensors other than a motion detector can be used in the present invention.

Also, as should be readily apparent to those skilled in the art, movement of the vehicle 102 may be determined from the changing position of the vehicle 102. In such a case, the microprocessor 204 periodically determines the current position of the vehicle 102 after the vehicle monitoring unit 108 has been activated. Based on the periodically determined positions, the microprocessor 204 determines the range of movement of the vehicle 102.

The position information is transmitted to the microprocessor 204. The position detector preferably comprises a satellite receiver 208 which receives satellite signals from a plurality of satellites, such as GPS satellites 110a, 110b and 110c, and determines position from those signals. Many satellite receivers are commercially available and well known in the art. Since the structure and philosophy of the satellite receiver 208 are not important to the present invention beyond detecting the position of the vehicle monitoring unit 108, they will not be described herein.

It should be understood, however, that any number of position detectors may be advantageously employed in the present invention. For example, position detectors which use mobile telephone signals to determine position may be used in the invention.

The microprocessor 204 stores the initial position of the unit 108, and thus the vehicle 102, in the memory device 206. Thereafter, the conventional motion detector 109 monitors the vehicle 102 for any movement. In response to a signal from the motion detector indicating movement of the vehicle 102, the microprocessor 204 accesses the satellite receiver 208 to determine the current position of the vehicle 102. The current position is compared to the initial position stored in the memory device 206 by a comparator 210. Those skilled in the art will readily comprehend that the microprocessor 204, memory device 206 and the comparator 210 may be a single controller chip and should be considered within the scope of the invention. Also, the current position of the vehicle 102 can be periodically determined to ensure operation in the event the motion detector is not used or fails to function.

By determining the difference between the initial position and the current position, a range of movement of the vehicle 102 is obtained. When this range equals or exceeds the range limit, the microprocessor 204 generates position signals representative of the position of the vehicle 102 and activates a transmitter 212 which transmits the position signals to the remote dispatch center 112. As noted previously, the remote dispatch center 112 then transmits the position of the vehicle 102 to law enforcement personnel 114.

FIG. 3 is a block diagram showing the sequential operation of the vehicle monitoring system 100 of the present invention. In response to control signals preferably from the remote transmitter 106, the system 100 is activated, at 300, by the vehicle operator 104. The initial position of the vehicle 102 is determined and stored, at 302, by the unit 108 and the motion detector 109 is activated, at 304.

Upon detection of movement of the vehicle, at 305, the current position of the vehicle 102 is determined, at 306, and the distance (range) the vehicle moved is calculated at 308 with respect to the initial position. It is noted that the initial position does not change but remains as originally stored in spite of movement of the vehicle within the permissible range. The range is next compared, at 310, to the selected range limit, at 312. If the range limit is not exceeded, the system determines whether the vehicle is still moving, at 313. If it is the position of the vehicle is once again determined and compared to the range limit. If the vehicle is not still moving, the system continues to monitor the vehicle for motion, at 305.

The current position of the vehicle 102 is monitored either periodically or in response to sensed motion of the vehicle with new vehicle positions being used to determine the range and whether the range equals or exceeds the range limit. Once the range equals or exceeds the range limit, the transmitter 212 is enabled and transmits the position signals, at 314, to the remote dispatch center 112, preferably on a substantially continuous basis for the purposes of tracking the vehicle.

Having thus described the invention in detail by way of reference to preferred embodiments thereof, it will be apparent that other modifications and variations are possible without departing from the scope of the invention defined in the appended claims.

What is claimed is:

1. A vehicle monitoring unit for a vehicle comprising:
    a position detector for detecting a current position of the vehicle;
    a controller circuit connected to said position detector for determining a range of movement of the vehicle based on said current position of the vehicle and for generating position signals indicative of the position of the vehicle if said range of movement is not within a range limit; and
    a transmitter connected to said controller circuit for transmitting said position signals.

2. The vehicle monitoring unit as recited in claim 1 wherein said position detector comprises a satellite receiver for receiving satellite signals from a plurality of satellites and for detecting the position of the vehicle based on said satellite signals.

3. The vehicle monitoring unit as recited in claim 1 comprising a remote control receiver for receiving control signals and for transmitting said control signals to said controller circuit, and wherein,
    said controller circuit activates and deactivates the vehicle monitoring unit based on said control signals.

4. The vehicle monitoring unit as recited in claim 3 wherein said control signals comprise infrared signals.

5. The vehicle monitoring unit as recited in claim 1 wherein said controller circuit comprises a comparator for comparing said range to said range limit and wherein,
    said controller circuit generates said position signals for transmission based on said comparison.

6. The vehicle monitoring unit as recited in claim 5 further comprising a remote control receiver connected to said controller circuit for receiving control signals, and wherein,
    said controller circuit selects said range limit based on said control signals and activates and deactivates the vehicle monitoring unit based on said control signals.

7. The vehicle monitoring unit as recited in claim 1 comprising a motion detector connected to said controller circuit for detecting movement of said vehicle and for generating a movement signal representative thereof, and wherein,
    said controller circuit determines said range of movement of said vehicle in response to said movement signal.

8. A monitoring system comprising:
    a remote dispatch center for communicating with law enforcement personnel; and
    an object monitoring unit positioned on an object for determining a current position of said object, for monitoring movement of said object based on the position of said object and for transmitting position signals indicative of the position of said object in response to specified movement of said object beyond a movement range limit.

9. The monitoring system as recited in claim 8 wherein said object monitoring unit comprises:
    a position detector for determining a current position of said object;

a controller circuit connected to said position detector for monitoring the position of said object, for determining said movement of said object based on said position, for detecting a range of movement of said object and for generating said position signals for transmission based on said range of said movement of said object if said range of said movement is not within said range limit; and a transmitter for transmitting said position signals from said object monitoring unit to said remote dispatch center.

10. The monitoring system as recited in claim 9 wherein said controller circuit comprises a comparator for comparing said range to said range limit, and wherein, said controller circuit generates said position signals based on said comparison.

11. The monitoring system as recited in claim 9 wherein said object monitoring unit comprises a remote control receiver connected to said controller circuit for receiving control signals and for transmitting said control signals to said controller circuit, and wherein, said controller circuit activates and deactivates the object monitoring unit based on said control signals.

12. The monitoring system as recited in claim 11 wherein said controller circuit selects said range limit based on said control signals.

13. The monitoring system as recited in claim 9 wherein said object monitoring unit further comprises a motion detector connected to said controller circuit for detecting movement of said object and for generating a movement signal representative thereof, and wherein, said controller circuit monitors the position of said object in response to said movement signal.

14. The monitoring system as recited in claim 9 wherein said position detector comprises a satellite receiver for receiving satellite signals from a plurality of satellites and for detecting the position of said object based on said satellite signals.

15. A method for activating a vehicle monitoring system comprising the steps of:

determining a current position of a vehicle;

determining a range of movement of said vehicle based on said current position;

comparing said range of movement of said vehicle to a range limit; and transmitting position signals representative of the position of said vehicle based on said comparison.

16. The method as recited in claim 15 comprising the step of activating said vehicle monitoring unit in response to control signals received from a remote transmitter.

17. The method as recited in claim 16 comprising the step of selecting said range limit based on said control signals.

18. The method as recited in claim 15 wherein said step of determining the position of said vehicle comprises the steps of:

receiving a plurality of satellite signals; and determining the position of said vehicle based on said satellite signals.

19. The method as recited in claim 15 wherein said step of transmitting position signals comprises the step of transmitting said position signals when said range of movement exceeds said range limit.

20. The method as recited in claim 15 comprising the step of selecting said range limit in response to control signals received from a remote transmitter.

21. A method for activating an object monitoring system comprising the steps of:

determining a current position of an object to be monitored;

determining a range of movement of said object based on said current position;

comparing said range of movement of said object to a range limit; and transmitting position signals representative of the position of said object based on said comparison.

22. A vehicle monitoring unit for a vehicle comprising:

a position detector for detecting a current position of the vehicle;

a controller circuit connected to said position detector for determining an allowable range of movement of the vehicle based on an initial position of the vehicle and for generating position signals indicative of the position of the vehicle when said current position of the vehicle is not within said allowable range; and a transmitter connected to said controller circuit for transmitting said position signals.

23. A monitoring system comprising:

a remote dispatch center for communicating with law enforcement personnel; and an object monitoring unit positioned on an object for determining a current position of said object, for monitoring movement of said object based on an initial position of said object and for transmitting position signals indicative of the current position of said object in response to specified movement of said object beyond an allowable range of movement.

24. The monitoring system as recited in claim 23 wherein said object monitoring unit comprises:

a position detector for determining the current position of said object;

a controller circuit connected to said position detector for monitoring the current position of said object, for determining said allowable range of movement of said object based on said initial position and for generating said position signals for transmission when said current position is not within said allowable range of movement; and a transmitter for transmitting said position signals from said object monitoring unit to said remote dispatch center.

* * * * *